United States Patent [19]

Kinoshita et al.

[11] Patent Number: 5,093,418
[45] Date of Patent: Mar. 3, 1992

[54] MODIFIED ETHYLENIC RANDOM COPOLYMER

[75] Inventors: Tatsuo Kinoshita, Yamaguchi; Syuji Minami, Ohtake, both of Japan

[73] Assignee: Mitsui Petrochemical Industries, Ltd., Tokyo, Japan

[21] Appl. No.: 451,586

[22] Filed: Dec. 18, 1989

Related U.S. Application Data

[60] Division of Ser. No. 346,335, May 1, 1989, Pat. No. 4,908,411, which is a continuation-in-part of Ser. No. 144,709, Jan. 14, 1988, abandoned, which is a continuation-in-part of Ser. No. 800,132, Nov. 20, 1985, abandoned.

[30] Foreign Application Priority Data

Nov. 22, 1984 [JP] Japan .................. 59-246330
Apr. 15, 1985 [JP] Japan .................. 60-78461
Apr. 25, 1985 [JP] Japan .................. 60-87477

[51] Int. Cl.$^5$ .................. C08L 51/04; C08F 255/04
[52] U.S. Cl. .................. 525/64; 525/69; 525/80; 525/84; 525/87; 525/285; 526/348
[58] Field of Search .................. 525/64, 69, 80, 84, 525/87

[56] References Cited

U.S. PATENT DOCUMENTS

| | | |
|---|---|---|
| 3,773,885 | 11/1973 | Schrage et al. |
| 4,033,888 | 7/1977 | Kiovsky .................. 525/285 |
| 4,033,889 | 7/1977 | Kiovsky .................. 525/285 |
| 4,161,452 | 7/1979 | Stambaugh et al. .................. 525/285 |
| 4,340,689 | 7/1982 | Joffrion .................. 525/285 |
| 4,358,564 | 11/1982 | Ames .................. 525/301 |
| 4,370,450 | 1/1983 | Grigo et al. |
| 4,376,855 | 3/1983 | Ames .................. 525/301 |
| 4,505,834 | 3/1985 | Papay et al. .................. 525/285 |
| 4,517,104 | 5/1985 | Bloch et al. .................. 525/301 |

FOREIGN PATENT DOCUMENTS 2162853 2/1986 United Kingdom .

*Primary Examiner*—Melvin I. Marquis
*Assistant Examiner*—Vasu S. Jagannathan
*Attorney, Agent, or Firm*—Sherman and Shalloway

[57] ABSTRACT

A modified ethylenic random copolymer derived from 100 parts by weight of a base ethylenic random copolymer composed of 25 to 75 mole % of ethylene and 75 to 25 mole % of an alpha-olefin having 3 to 20 carbon atoms and grafted thereto, (a) 0.2 to 50 parts by weight of an unsaturated carboxylic acid having 3 to 10 carbon atoms or an anhydride or ester thereof, (b) 0.2 to 200 parts by weight of a styrene-type hydrocarbon having 8 to 12 carbon atoms, or (c) 0.2 to 300 parts by weight of an unsaturated silane compound having 2 to 20 carbon atoms, said modified ethylenic random copolymer having an intrinsic viscosity [$\eta$], measured in decalin at 135° C., of 0.01 to 1.5 dl/g and a molecular weight distribution ($\overline{M}w/\overline{M}n$), measured by gel permeation chromatography, of not more than 4.

19 Claims, No Drawings

MODIFIED ETHYLENIC RANDOM COPOLYMER

This is a division of application Ser. No. 07/346,335, now U.S. Pat. No. 4,908,411, which is a CONT of Ser. No. 07/144,709, filed 1/14/88,abandoned, which is a CONT of Ser. No. 06/800,132, filed November 20, 1985 abandoned.

This invention relates to a novel modified ethylenic random copolymer. More specifically, it relates to a liquid modified ethylenic random copolymer which can exhibit excellent performance, for example as a modifier or modifying aid for various resins or rubbery polymers, a lubricant oil additive, or a dispersing aid for aqueous dispersions of resins or rubbery polymers.

It is known that modified olefinic polymers obtained by graft copolymerizing high-molecular-weight olefinic polymers such as polyethyene or polypropylene with monomers such as unsaturated carboxylic acids, anhydrides thereof, styrene and unsaturated silane compounds are used as modifiers for resins, adhesives, tackifiers, etc. Since, however, these modified olefinic polymers have a high molecular weight and are solid, they do not exhibit sufficient performance in some applications.

Some modified olefinic polymers having a relatively low molecular weight, on the other hand, have been proposed which are obtained by graft copolymerizing liquid olefinic polymers such as low-molecular-weight polybutene or polyisobutylene with unsaturated carboxylic acids, the anhydrides or esters thereof, unsaturated silane compounds, etc. (see U.S. Pat. Nos. 3,912,764 and 4,320,214, British Patent No. 1,480,453, Japanese Patent Publication No. 23,668/1977, and Japanese Laid-Open Patent Publications Nos. 144,995/1978, 28,386/1979 and 149,741/1979.) These low-molecular-weight modified olefinic polymers, however, do not show excellent performance in such applications as modifiers or modifying aids for rubbery polymers, particularly silicon-containing rubbery polymers, lubricant oil additives and dispersing aids for aqueous dispersions of resins or rubbery polymers. In the compounding of rubbery polymers, attempts have been made to provide rubbery polymer compositions having excellent weatherability, oxidation resistance and tackiness by incorporating an ethylene/alpha-olefin or ethylene/alpha-olefin/diene elastomeric copolymer in natural rubber or a synthetic rubbery polymer such as polyisoprene, polyisobutylene or chloroprene. The mere blending of the two, however, has the defect of causing a deterioration in the dynamical properties of the resulting composition, and usually to remove this defect, the aforesaid low-molecular-weight modified olefinic polymers are incorporated as a modifying aid. The modifying effect of these modified polymers is small and not satisfactory.

Japanese Laid-Open Patent Publication No. 147533/1982 proposes a modified low-molecular-weight olefinic polymer obtained by graft copolymerizing a waxy low-molecular-weight olefinic polymer with a styrene-type hydrocarbon compound as a releasability improver for styrene-type polymers. However, a tackifier composition prepared by incorporating such a modified low-molecular-weight olefinic polymer as a modifier or modifying aid in a styrene-type polymer such as a styrene/isoprene/styrene block copolymer (to be sometimes abbreviated as "SIS") has poor tack and adhesion strength.

Among the conventional styrene-type polymers, SIS has a large cohesive force, but cannot by itself give a tackifier having excellent tack and adhesion strength. It has therefore been the practice to incorporate various modifiers in order to use these styrene polymers in the field of tackifiers. For example, it is known to incorporate a process oil or modified wax in SIS, but this brings about a defect such as a reduction in the adhesion strength of the resulting composition. It has been desired in this field therefore to develop a modifier which when incorporated into such a styrene polymer as SIS, can give a composition having excellent tack and adhesion strength.

One object of this invention is to provide a low-molecular-weight modified ethylenic copolymer which is useful as a modifier or a modifying aid for various resins and rubbery polymers, particularly as a modifying aid for rubbery polymer compositions, and can give rubbery polymer compositions or modified resins having excellent dynamical properties when incorporated as a modifying aid in rubbery polymer compositions comprising natural rubber or a rubbery polymer such as polyisobutylene or chloroprene and an ethylene/alpha-olefin or ethylene/alpha-olefin/diene elastomeric copolymer or in resins such as polyolefins and polyethylene terephthalate.

Another object of this invention is to provide a low-molecular-weight modified ethylenic copolymer which when incorporated as a modifier in a styrene-type polymer, gives a styrene-type polymer composition having excellent tack and/or adhesion strength.

Still another object of this invention is to provide a low-molecular-weight modified ethylenic copolymer which exhibits excellent performance in such applications as a lubricant oil additive or a dispersing aid for aqueous dispersions of resins or rubbery polymers.

Other objects of this invention along with its advantages will become apparent from the following description.

According to this invention, there is provided a modified ethylenic random copolymer derived from 100 parts by weight of a base ethylenic random copolymer composed of 25 to 75 mole% of ethylene and 75 to 25 mole% of an alpha-olefin having 3 to 20 carbon atoms and grafted thereto, (a) 0.2 to 50 parts by weight of an unsaturated carboxylic acid having 3 to 10 carbon atoms or an anhydride or ester thereof, (b) 0.2 to 200 parts b, weight of a styrene-type hydrocarbon having 8 to 12 carbon atoms, or (c) 0.2 to 300 parts by weight of an unsaturated silane compound having 2 to 20 carbon atoms, said modified ethylenic random copolymer having an intrinsic viscosity, measured in decalin at 135° C., of 0.01 to 1.5 dl/g and a molecular weight distribution ($\overline{Mw}/\overline{Mn}$), measured by gel permeation chromatography, of not more than 4.

The modified ethylenic random copolymer of the invention will now be described in detail.

Ethylenic random copolymer as a base polymer

The ethylenic random copolymer as a base of the modified ethylenic random copolymer of this invention is a random copolymer, preferably being liquid, prepared by copolymerizing ethylene with at least one alpha-olefin having 3 to 20 carbon atoms. The random copolymer is composed of 25 to 75 mole%, preferably 30 to 70 mole%, more preferably 40 to 60 mole%, of ethylene units and 75 to 25 mole%, preferably 70 to 30 mole%, more preferably 60 to 40 mole%, of $C_3$-$C_{20}$ alpha-olefin units (the mole% is based on the total amount of ethylene and $C_3$–$C_{20}$ alpha-olefin).

The ethylenic random copolymer as a base desirably has at least one, preferably all, of the following properties.

| | Properties | General range | Preferred range | Optimum range |
|---|---|---|---|---|
| (a) | Intrinsic viscosity [η] (*1) (dl/g) | 0.01–1.5 | 0.01–1.0 | 0.01–0.3 |
| (b) | Molecular weight distribution (*2) | Not more than 4 | 1.2–3 | 1.3–2.5 |
| (c) | Number average molecular weight (*3) | 200–10000 | 400–8000 | 500–5000 |
| (d) | Z value (*4) | 10–300 | 15–250 | 15–200 |
| (e) | σ value (*5) | 0–3 | 0–2 | 0–1 |

(*1): Measured in decalin at 135° C. When the modifier to be described hereinbelow is an unsaturated carboxylic acid or its anhydride or ester, the ethylenic random copolymer as a base desirably has a low intrinsic viscosity of advantageously 0.01 to 0.3 dl/g, especially 0.03 to 0.25 dl/g.
(*2): The molecular weight distribution is defined by the ratio of the weight average molecular weight ($\overline{Mw}$) to the number average molecular weight ($\overline{Mn}$), and is measured by gel permeation chromatography (GPC for short).
(*3): Measured by the GPC method. When the modifier to be described hereinbelow is an unsaturated carboxylic acid or its anhydride or ester, the ethylenic random copolymer as a base suitably has a low $\overline{Mn}$ of advantageously 300 to 5000, particularly 500 to 4000.
(*4): The Z value is the ratio of the maximum value of the molecular weight to the minimum value of the molecular weight determined in accordance with the GPC method. For detail, see below.
(*5): The σ-value is calculated in accordance with the formula $$\overline{E} = \sum_i E_i W_i / \sum_i W_i$$

$$\sigma = \sqrt{\sum_i (E_i - \overline{E})^2 W_i}$$

by fractionating the copolymer with acetone/hexane mixed solvent having various mixing proportions, and finding the ethylene content (Ei) and the weight ratio (Wi) based on the total weight of the copolymer, of the copolymer extracted in the i-th fraction. The σ value is a measure of the composition distribution of the copolymer.

More specific methods of determining the molecular weight distribution (b), the number average molecular weight (c) and the Z value (d) are as follows: The number average molecular weight and weight average molecular weight of the copolymer are measured by the following method. For details of the method, reference may be made to Journal of Polymer Science, Part A-II, vol. 8, pages 89–103 (1970).

Elution counts of a standard substance having a known molecular weight (16 samples of monodisperse polystyrene having different molecular weights selected from the range of 500 to $840 \times 10^4$) were measured by GPC (gel-permeation chromatography), and a calibration curve showing the relation between the molecular weight and the elution count was prepared. The GPC pattern of a copolymer sample was taken by GPC. From the calibration curve, the molecular weights (Mi) at the individual counts (i) were read, and from the GPC pattern, the elution volumes (Ni) at the individual counts (i) were read. The number average molecular weight ($\overline{Mn}$) and weight average molecular weight ($\overline{Mw}$), both as polystyrene, of the copolymer sample were calculated in accordance with the following equations.

$$\overline{Mn} = \Sigma MiNi/\Sigma Ni$$

$$\overline{Mw} = \Sigma Mi^2 Ni/\Sigma MiNi$$

Separately, the molecular weight, calculated as polystyrene, of squalane (an isoparaffinic standard substance having a molecular weight of 422) was measured by GPC.

Thus, the $\overline{Mn}$, Q value and Z value of the copolymer of this invention were calculated by the following equations.

$$\overline{Mn} \text{ of the copolymer} = \frac{\overline{Mn} \text{ of copolymer as polystyrene}}{\text{Molecular weight of squalane as polystyrene}} \times \frac{\text{molecular weight of squalane}}{(422)}$$

$$Q \text{ value} = \frac{\overline{Mw} \text{ of copolymer as polystyrene}}{\overline{Mn} \text{ of copolymer as polystyrene}}$$

The minimum and maximum elution counts of the GPC pattern of the copolymer were read, and the corresponding minimum and maximum molecular weights of the copolymer, calculated as polystyrene, were read from the calibration curve. The Z value was thus calculated from the following equation.

$$Z \text{ value} = \frac{\text{Maximum molecular weight of the copolymer as polystyrene}}{\text{Minimum molecular weight of the copolymer as polystyrene}}$$

Specific examples of the $C_3$–$C_{20}$ alpha-olefins to be copolymerized with ethylene in the preparation of the ethylenic random copolymer as a base polymer include propylene, 1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene. $C_3$–$C_{10}$ alpha-olefins such as propylene, 1-butene, 1-hexene, 1-octene and 1-decene, particularly propylene and 1-butene are preferred. They may be used either singly or in combination.

The copolymerization of ethylene with the alpha-olefin can be carried out by using Ziegler catalysts known per se, preferably by the methods disclosed in Japanese Laid-open Patent Publications Nos. 117595/1982 and 123205/1982 and European Patent Application 60609 (A.1). For example, Japanese Laid-Open Patent Publication No. 123205/1982 discloses a method for copolymerizing ethylene with an alpha-olefin having at least 3 carbon atoms in the liquid phase in the presence of hydrogen using a catalyst formed from a soluble vanadium compound and an organoaluminum compound In this method, the copolymerization is carried out continuously. The concentration of the vanadium compound in the polymerization system is adjusted to at least 0.3 millimole per liter of the liquid phase, and the vanadium compound to be fed to the polymerization system is used as diluted in a polymerization medium so that its concentration is not more than 5 times the concentration of the vanadium compound in the polymerization system.

The ethylenic random copolymer used as a base in this invention is preferably liquid at ordinary temperature. But when a styrene-type hydrocarbon or an unsaturated silane compound is used as the modifier, the ethylenic random copolymer may sometimes be one which has a high ethylene content and a high intrinsic viscosity and is semi-solid at ordinary temperature. In this case, the ethylenic random copolymer may have a crystallinity, as measured by X-ray diffractometry, of usually not more than 5 %, preferably not more than 2 %.

Modifier

According to this invention, the ethylenic random copolymer described above is modified b, graft copolymerizing it with a specific compound (modifier). The modifier used in this invention is (a) an unsaturated carboxylic acid having 3 to 10 carbon atoms or its anhydride or ester (to be sometimes referred to inclusively as the "unsaturated carboxylic acid compound"), (b) a $C_8-C_{12}$ styrene-type hydrocarbon, or (c) an unsaturated silane compound having 2 to 20 carbon atoms. These modifier compounds are described below in detail.

(a) $C_3-C_{10}$ Unsaturated carboxylic acid or its anhydride or ester

Specific examples of the unsaturated carboxylic acid compound include unsaturated carboxylic acids such as acrylic acid, methacrylic acid, maleic acid, fumaric acid, itaconic acid, citraconic acid, tetrahydrophthalic acid or bicyclo[2.2 1]hept-2-ene-5,6-dicarboxylic acid; anhydrides of unsaturated carboxylic acids such as maleic anhydride, itaconic anhydride, citraconic anhydride, tetrahydrophthalic anhydride and bicyclo2.2.1-]hept-2-ene-5,6-dicarboxylic anhydride; and unsaturated carboxylic acid esters, particularly mono- or di-(lower alkyl) esters of unsaturated carboxylic acids, such as methyl acrylate, methyl methacrylate, 2-hydroxyethyl acrylate, 2-hydroxyethyl methacrylate, dimethyl maleate, monomethyl maleate, diethyl fumarate, dimethyl itaconate, diethyl citraconate, dimethyl tetrahydrophthalate, dimethyl bicyclo2.2.1-]hept-2-ene-5,6-dicarboxylate, glycidyl acrylate and glycidyl methacrylate. Among these, $C_3-C_6$ unsaturated carboxylic acids or its anhydride such as acrylic acid, methacrylic acid, maleic acid,maleic anhydride and glycidyl methacrylate, especially maeleic acid, or anhydrides thereof such as maleic anhydride, and mono- or di-lower alkyl esters thereof are preferred. The term "lower", as used herein, means that a group or compound qualified by this term has not more than 6, preferably not more than 4, carbon atoms.

The proportion of the unsaturated carboxylic acid compound grafted to the ethylenic random copolymer is 0.2 to 50 parts by weight, preferably 0.5 to 40 parts by weight, especially preferably 1 to 30 parts by weight, per 100 parts by weight of the ethylenic random copolymer.

(b) $C_8-C_{12}$ Styrene-type hydrocarbon

Suitable styrene-type hydrocarbons are those corresponding to the following formula

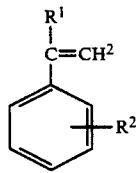

wherein $R^1$ and $R^2$, independently from each other, represent a hydrogen atom or an alkyl group having 1 to 4 carbon atoms. Specific examples of these hydrocarbons are styrene, o-vinyltoluene, m-vinyltoluene, p-vinyltoluene, m-isopropylstyrene, p-isopropylstyrene, alpha-methylstyrene, o-methyl-alpha-methylstyrene, m-methyl-alpha-methylstyrene, p-methyl-alpha-methylstyrene, m-isopropyl-alpha-methylstyrene, and p-isopropyl-alpha-methylstyrene. Styrene is preferred.

The proportion of the styrene-type hydrocarbon grafted to the ethylenic random copolymer is 0.2 to 200 parts by weight, preferably 0.5 to 150 parts by weight, especially preferably 1 to 100 parts by weight, per 100 parts by weight of the ethylenic random copolymer.

(c) $C_2-C_{20}$ Unsaturated silane compound

The unsaturated silane compound used in this invention includes silane compounds having 1 or 2 vinyl groups per molecule, and suitable unsaturated silane compounds are represented by the following formula

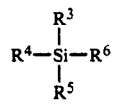

wherein one or two of $R^3$, $R^4$, $R^5$ and $R^6$ represent a vinyl or allyl group, and the remainder represent a hydrogen atom, a lower alkyl group, a lower alkoxy group, a lower alkanoyl group, a lower alkoxyalkoxy group, an aryl group (particularly a phenyl group), an aryloxy group (especially a phenoxy group), an aralkyl group (such as a benzyl group), or an aralkoxy group (such as a benzyloxy group), provided that the total number of carbon atoms of $R^3$, $R^4$, $R^5$ and $R^6$ is in the range of 2 to 20. Specific examples include monovinylsilanes such as trimethoxyvinylsilane, triethoxyvinylsilane, trimethylvinylsilane, diethylmethylvinylsilane, diacetoxymethylvinylsilane, diethoxymethylvinylsilane, ethoxydimethylvinylsilane, triacetoxyvinylsilane, tris(2-methoxyethoxy)vinylsilane, triphenylvinylsilane and triphenoxyvinylsilane; and polyvinylsilanes such as diphenyldivinylsilane and allyloxydimethylvinylsilane. Of these, unsaturated silane compounds having 2 to 8 carbon atoms, especially trimethoxyvinylsilane and triethoxyvinylsilane, are preferred.

The proportion of the unsaturated silane compound grafted to the ethylenic random copolymer is 0.2 to 300 parts by weight, preferably 0.5 to 200 parts by weight, especially preferably 1 to 100 parts by weight, per 100 parts by weight of the ethylenic random copolymer.

In the present invention, the proportion of the grafting monomer grated to the base polymer is expressed in parts by weight per 100 parts by weight of the ethylenic random copolymer in the modified ethylenic random copolymer. In the case of a modified ethylenic random copolymer having grafted thereto the alpha,beta-carboxylic acid compound (a), the proportion of the compound (a) grafted is determined from the oxygen content of the copolymer measured by an oxygen analyzer and the IR analysis of the copolymer. The proportion of the styrene-type hydrocarbon (b) grafted is determined by $C^{13}$ NMR analysis, and the proportion of the unsaturated silane compound (c) grafted is determined from the weight of Si measured by weight analysis.

Graft copolymer

The modified ethylenic random copolymer of this invention can be produced by reacting (graft copolymerizing) the ethylenic random copolymer with the modifier in the presence of a radical initiator. The reaction can be carried out usually in an inert gas atmosphere in the presence of a solvent, or in the absence of a solvent. The reaction can be carried out, for example, by continuously or intermittently feeding the modifier compound and the radical initiator with stirring to the heated liquid ethylenic random copolymer in the presence or absence of a solvent. The proportions of the modifier and the radical initiator fed in this graft copolymerization reaction, and the reaction temperature and time can be varied depending upon the type of the modifier, etc. Generally, these reaction conditions may be selected as tabulated below according to the type of the modifier compound.

peroxide, di-tert-butyl peroxide, 2,5-dimethyl-2,5-di(-peroxybenzoate)hexyne-3, 1,4-bis(tert-butylperoxyiso-pro-pyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate.

Examples of the solvent that can be used are aromatic hydrocarbons such as benzene, toluene, xylene, monochlorobenzene and dichlorobenzene, and aliphatic or alicyclic hydrocarbons or halogenation products thereof, such as pentane, hexane, cyclohexane, heptane, and octane. The aromatic hydrocarbon solvent is preferred. The absence of solvent is also preferred.

The separation of the modified ethylenic random copolymer from the reaction mixture and its purification may be carried out by methods known per se, for example by distillation or solvent fractionation.

Modified ethylenic random copolymer

The modified ethylenically random copolymer provided by this invention has an intrinsic viscosity [θ], measured in decalin at 135° C., of 0.01 to 1.5 dl/g, and a molecular weight distribution (M̄w/M̄n), measured by

|  |  | Unsaturated carboxylic acid compound | Styrene-type hydrocarbon | Unsaturated silane compound |
|---|---|---|---|---|
| Proportion of the modifier (parts by weight per 100 parts by weight of the ethylenic random copolymer) | Generally | 0.2–50 | 0.12–200 | 0.2–300 |
|  | Preferably | 0.5–40 | 0.5–150 | 0.5–200 |
|  | More preferably | 1–30 | 1–100 | 1–100 |
| Proportion of the radical initiator (parts by weight per 100 parts by weight of the ethylenic random copolymer) | Generally | 0.04–15 | 0.02–40 | 0.04–15 |
|  | Preferably | 0.1–10 | 0.1–20 | 0.1–10 |
| Reaction temperature (°C.) | Generally | 120–200 | 50–200 | 120–200 |
|  | Preferably | 130–180 | 60–180 | 130–180 |
| Reaction time (hrs) | Generally | 0.5–60 | 0.5–100 | 0.5–80 |
|  | Preferably | 1–50 | 1–50 | 1–50 |

Usually organic peroxides are used as the radical initiator for the graft copolymerization reaction. The organic peroxides preferably have a decomposition temperature, at which the half value is 1 minute, of 60° to 270° C., especially 150° to 270° C. Specific examples are organic peroxides and organic peresters, such as benzoyl peroxide, dichlorobenzoyl peroxide, dicumyl the GPC method, of not more than 4.

The preferred properties which the modified ethylenic random copolymer of this invention should have vary depending upon the type of the modifier or the end use of the copolymer. Generally, they are desirably within the following ranges.

|  |  | Ethylenic random copolymer modified with the unsaturated carboxylic acid compound | Ethylenic random copolymer modified with the styrene-type hydrocarbon | Ethylenic random copolymer modified with the unsaturated silane compound |
|---|---|---|---|---|
| (1) | Form | Liquid | Liquid or semisolid, preferably liquid | Liquid or semisolid, preferably liquid |
| (2) | Intrinsic viscosity (dl/g) | 0.01–0.3, preferably 0.03–0.25, especially 0.04–0.25 | 0.01–1.0, preferably 0.02–0.9, especially 0.03–0.8 | 0.01–1.5 |
| (3) | Molecular weight distribution (Mw/Mn) | ≦4, preferably 1.2–3, more preferably 1.3–2.5 | 0.01–1.0, preferably 0.02–0.9, especially 0.03–0.8 | 0.01–1.5 |
| (4) | Proportion of the grafting | 0.2–50, preferably 0.5–40, more preferably 1–30 | 0.2–200, preferably 0.5–150, more preferably 1–100 | 0.2–300, preferably 0.5–200, more preferably 1–100 |

| Ethylenic random copolymer modified with the unsaturated carboxylic acid compound | Ethylenic random copolymer modified with the styrene-type hydrocarbon | Ethylenic random copolymer modified with the unsaturated silane compound |
|---|---|---|
| monomer | | |

Utility (i) The modified ethylenic random copolymers of this invention modified with the unsaturated carboxylic acid compound or unsaturated silane compound can be used as modifiers or modifying aids for rubbery polymer compositions. Such a rubbery polymer composition comprises (A) an ethylene/alpha-olefin or ethylene/alpha-olefin/diene elastomeric copolymer or a mixture of the elastomeric copolymer (A) with (B) at least one rubbery polymer selected from the group consisting of natural rubbers, chloroprene rubber, isoprene rubber, butadiene rubber and acrylic rubber, (C) the modified ethylenic random copolymer of the invention, and (D) another component. Usually, 5 to 95 parts by weight, preferably 10 to 90 parts by weight, of (A) and 95 to 5 parts by weight, preferably 90 to 10 parts by weight, of (B) are blended in the rubbery polymer composition. The proportion of the modified ethylenic random copolymer (C) is usually 1 to 50 parts by weight, preferably 5 to 30 parts by weight per 100 parts by weight of (A) and (B) combined when it is modified with the unsaturated carboxylic acid component. When it is modified with the unsaturated silane compound, its proportion is usually 0.2 to 100 parts by weight, preferably 0.5 to 200 parts by weight, on the same basis.

The elastomeric copolymer (A) to be incorporated in the rubber polymer composition includes, for example, ethylene/alpha-olefin elastomeric copolymers having an ethylene content of 30 to 90 mole% and a crystallinity of 0 to 30 %, preferably 0 to 10 %, such as ethylene/propylene copolymer, ethylene/1-butene copolymer, ethylene/4-methyl-1-pentene copolymer, ethylene/1-hexene copolymer and ethylene/1-decene copolymer; and ethylene/alpha-olefin/diene elastomeric copolymers having an ethylene/alpha-olefin mole ratio of 0.3 to 9 and a diene content of usually 0.5 to 10 mole% such as ethylene/propylene/dicyclopentadiene copolymer, ethylene/propylene/5-ethylidene-2-norbornene copolymer, ethylene/propylene/1,4-hexadiene copolymer, ethylene/1-butene/dicyclopentadiene copolymer and ethylene/1-butene/5-ethylidene-2-norbornene copolymer.

Examples of the other compound (D) to be incorporated into the rubbery polymer composition are crosslinking agents, crosslinking accelerators, stabilizers such as heat stabilizers, oxidation accelerators and antioxidants, and fillers.

Specific examples of the crosslinking agents are peroxides, sulfur, sulfur compounds such as sulfur monochloride, sulfur dichloride, morpholine disulfide, alkylphenol disulfides, tetramethylthiuram disulfide and selenium dimethyldithiocarbamate, and metal compounds such as magnesium oxide, zinc oxide and red lead. Usually, sulfur is used in an amount of 0.05 to 10 parts by weight, preferably 0.1 to 5 parts by weight, per 100 parts by weight of the rubbery component composed of (A) or a mixture of (A) and (B). As required, crosslinking accelerators may be used. Examples of the crosslinking accelerators include thiazole compounds such as N-cyclohexyl-2-benzothiazole sulfenamide, N-oxydiethylene-2-benzothiazole sulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and benzothiazyl disulfide; guanidine compounds such as diphenylguanidine, triphenylguanidine, di-ortho-tolyl-guanidine, ortho-tolyl biguanide and diphenylguanidine phthalate; butyraldehyde/aniline condensate; aldehydeamines or aldehyde-ammonia compounds such as hexamethylene-tetramine or acetaldehyde ammonia condensate; imidazoline compounds such as 2-mercaptoimidazolien; thiourea compounds such as thiocarbanilide, diethylthiourea, dibutylthiourea, trimethylthiourea and di-ortho-tolylthiourea; thiuram compounds such as tetramethylthiuram monosulfide, tetramethylthiuram disulfide, tetraethylthiuram disulfide, tetrabutylthiuram disulfide and dipentamethylenethiuram tetrasulfide; dithiocarbamates such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethylthiocarbamate, selenium dimethylthiocarbamate and tellurium diethyldithiocarbamate; and xanthates such as zinc dibutylxanthogenate.

The crosslinking accelerators are used in a proportion of usually 0.1 to 20 parts by weight, preferably 0.2 to 10 parts by weight, per 100 parts by weight of the component (A) or the mixture of components (A) and (B).

Illustrative of peroxides used in peroxide vulcanization are dicumyl peroxide, 1,1'-di(t-butylperoxy)-3,3,5-trimethylcyclohexane, di(t-butylperoxy)diisopropylbenzene, 2,5-dimethyl-2,5-di(t-butylperoxy)hexane and 2,5-dimethyl-2,5-di(t-butylperoxy)hexyne. As a crosslinking accelerator for the peroxide vulcanization, sulfur, sulfur compounds such as dipentamethylenethiuram tetrasulfide, polyfunctional monomers such as ethylene dimethacrylate, divinylbenzene, diallyl phthalate, metaphenylene bismaleimide and tolylene bismaleimide, and oxime compounds such as p-quinonedioxime and p,p'-dibenzoylquinoneoxime may be used singly or in combination.

As required, the rubbery polymer composition may contain other additives such as activators, dispersants, fillers, plasticizers, tackifiers, coloring agents, blowing agents, blowing aids, lubricants and antioxidants.

Examples of the fillers include inorganic fillers such as carbon black, white carbon (silica compounds), calcium carbonate, talc and clay, and organic fillers such as high-styrene resin, coumarone-indene resin, phenolic resins, lignin, modified melamine resins and petroleum resins. The organic fillers are preferred.

Examples of the softening agents include petroleum-type softening agents such as process oils, lubricant oils, paraffins, liquid paraffins, petroleum asphalt and Vaseline; coal tar-type softening agents such as coal tar and coal tar pitch; fatty oil-type softening agents such as castor oil, linseed oil, rapeseed oil and coconut oil; tall oil; waxes such as beeswax, carnauba wax and lanolin; fatty acids and fatty acid salts such as licinoleic acid, palmitic acid, barium stearate, calcium stearate and zinc laurate; and synthetic polymeric substances such as petroleum resins.

Examples of the plasticizer are phthalic acid esters, adipic acid esters, sebacic acid esters and phosphoric acid-type plasticizers.

Examples of the tackifiers are petroleum resin, coumarone-indene resin, terpene-phenol resin, and xylene/formaldehyde resin.

Examples of the coloring agents are inorganic and organic pigments.

Examples of the blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide and p-toluenesulfonyl azide.

Salicyclic acid, phthalic acid and urea, for example, may be used as the blowing aids.

The composition may be prepared by known methods using an open roll mill, a Banbury mixer, a kneader, etc.

The crosslinking may be carried out at a temperature of usually 100° to 270° C., preferably 120° to 250° C., for a period of usually 1 minute to 120 minutes, preferably 1.5 to 60 minutes. In the case of peroxide vulcanization, the crosslinking time is preferably adjusted to about 4 times the half life of the peroxide.

(ii) The modified ethylenic random copolymers of this invention modified with the styrene-type hydrocarbons are useful as modifiers for styrene-type polymer compositions.

Such a styrene-type polymer composition is composed of (E) the styrene-type polymer, (F) the modified ethylenic random copolymer of the invention and (G) another optional component. The proportion of the modified ethylenic random copolymer incorporated is usually 1 to 80 parts by weight, preferably 10 to 50 parts by weight, per 100 parts by weight of the styrene polymer (E). The proportion of the optional component (G) is not particularly restricted.

Specific examples of the styrene-type polymer to be incorporated into the styrene-type polymer composition include polystyrene, high impact polystyrene, acrylonitrile/butadiene/styrene copolymer (ABS), styrene/isoprene/styrene block copolymer (SIS), styrene/butadiene/styrene block copolymer (SBS), and hydrogenated styrene/butadiene/styrene block copolymer (SEBS).

Specific examples of the optional component (G) are tackifiers such as petroleum resins and mineral oils, stabilizers such as heat stabilizers, weatherability stabilizers, oxidation stabilizers and antioxidants, dispersants, fillers, plasticizers, coloring agents and lubricants.

The styrene-type polymer composition may be produced by mixing the styrene-type polymer (E), the modified ethylenic random copolymer (F) and the optional component (G) by conventionally known methods.

Advantages (1) The liquid modified ethylenic random copolymers of this invention modified with the unsaturated carboxylic acid compounds exhibit excellent performance as modifiers or modifying aids for resins or rubbery polymers, lubricant oil additives, and dispersing aids for aqueous dispersions of rubbery polymers. In particular, when such a liquid modified ethylenic random copolymer is incorporated as a modifying aid in a rubbbery polymer composition composed of an ethylene/alpha-olefin/diene elastomeric copolymer or a mixture of it with a rubbery polymer (B), the resulting composition has excellent weatherability, heat aging resistance and tackiness and improved dynamical properties.

(2) The liquid ethylenic random copolymers of this invention modified with the unsaturated silane compounds exhibit excellent performance as modifiers or modifying aids for resins or rubbery polymer, lubricant oil additives and dispersing aids for aqueous dispersions of resins or rubbery polymers. In particular, when such a modified ethylenic random copolymer is incorporated as a modifying aid in a rubber polymer composition comprising an ethylene/alpha-olefin/diene elastomeric copolymer and a silicon-containing rubbery polymer, the resulting composition has markedly improved rubbery elasticity, particularly permanent stretch (PS), and heat aging resistance.

(3) The modified ethylenic random copolymers of this invention modified with the styrene-type hydrocarbons exhibit excellent performance as modifiers or modifying aids for styrene-type polymers and lubricant oil additives When such a modified ethylenic random copolymer is incorporated in a styrene-type polymer, the viscosity of the styrene polymer is decreased, and the resulting composition has improved tack and adhesion.

The following examples illustrate the present invention more specifically.

EXAMPLE 1

A 2-liter glass flask equipped with a nitrogen blowing tube, a water-cooling condenser, a thermometer, two dropping funnels, and a stirrer was charged with 800 g of a liquid ethylene/propylene random copolymer having an ethylene content of 50 mole%, a number average molecular weight of 810, a $\overline{Mw}/\overline{Mn}$ of 1.40, and an intrinsic viscosity of 0.04 dl/g, a dynamic viscosity at 100° C. of 22.8 centistokes, a Z value of 160 and a $\sigma$ value of 0.1. The flask was purged with nitrogen for 2 hours to drive off the dissolved oxygen. Thereafter, the inside temperature of the flask as raised to 160° C., and 40 g of maleic anhydride (heated to 60° C. to make it liquid) and 8 g of di-tert.-butyl peroxide previously charged into the two dropping funnels were added dropwise over the course of 4 hours. After the addition, the reaction was carried out further for 4 hours. Then the temperature of the inside of the flask was raised to 180° C., and the unreacted maleic anhydride and the decomposition product of di-tert.-butyl peroxide were removed under a reduced pressure of 0.5 mmHg.

The resulting modified ethylene/propylene copolymer is a yellow transparent liquid having an intrinsic viscosity [η] of 0.04 dl/g, a $\overline{Mw}/\overline{Mn}$ of 1.40 and a dynamic viscosity at 100° C. of 33.8 centistokes. The proportion of the maleic anhydride component grafted was 4.5 parts by weight per 100 parts by weight of the ethylene/propylene copolymer in the modified ethylenic random copolymer.

EXAMPLE 2

Example 1 was repeated except that the amounts of maleic anhydride and di-tert-butyl peroxide used were changed to 120 g and 24 g, respectively. A modified ethylene/propylene copolymer was obtained as a yellow transparent liquid having an intrinsic viscosity [η] of 0.05 dl/g and a $\overline{Mw}/\overline{Mn}$ of 1.40. The proportion of the maleic anhydride component grafted was 12 parts by weight per 100 parts by weight of the ethylene/propylene copolymer in the modified ethylenic random copolymer.

EXAMPLE 3

Example 1 was repeated except that the polymer to be modified was changed to an ethylene/propylene copolymer having an ethylene content of 72 mole%, a number average molecular weight of 4600, a $\overline{Mw}/\overline{Mn}$ of 1.85, an intrinsic viscosity [$\eta$] of 0.26 dl/g, a Z value of 160 and a $\sigma$ value of 0.1. A modified ethylene/propylene copolymer was obtained as a yellow transparent liquid having an intrinsic viscosity [$\eta$] of 0.27 dl/g and a $\overline{Mw}/\overline{Mn}$ of 1.83. The proportion of the maleic anhydride component grafted was 4.4 parts by weight per 100 parts by weight of the ethylene/propylene copolymer in the modified ethylenic random copolymer.

EXAMPLE 4

Example 1 was repeated except that a liquid ethylene/1-hexene random copolymer having an ethylene content of 52 mole%, a $\overline{Mn}$ of 790, $\overline{Mw}/\overline{Mn}$ of 1.43, an intrinsic viscosity [$\eta$] of 0.04 dl/g, a Z value of 85, a $\sigma$ value of 0.1 and a dynamic viscosity at 100° C. of 23.5 centistokes was used instead of the ethylene/propylene copolymer. A modified ethylene/1-hexene copolymer was obtained as a yellow transparent liquid having an intrinsic viscosity of 0.04 dl/g, a $\overline{Mw}/\overline{Mn}$ of 1.42, and a dynamic viscosity at 100° C. of 32.9 centistokes. The proportion of the maleic anhydride component grafted was 4.4 parts by weight per 100 parts by weight of the ethylene/1-hexene copolymer in the modified ethylenic random copolymer.

EXAMPLE 5

Example 1 was repeated except that maleic acid was used instead of maleic anhydride as the grafting component. A modified ethylene/propylene copolymer was obtained as a yellow transparent liquid having an intrinsic viscosity [$\eta$] of 0.04 dl/g, a $\overline{Mw}/\overline{Mn}$ of 1.43 and a dynamic viscosity at 100° C. of 35.1 centistokes. The proportion of the maleic acid component grafted was 4.5 parts by weight per 100 parts by weight of the ethylene/propylene copolymer in the modified ethylenic random copolymer.

EXAMPLE 6

A 1-liter glass reactor was charged with 595 g of an ethylene/propylene copolymer having an ethylene content of 49 mole%, a number average molecular weight of 1500, a $\overline{Mw}/\overline{Mn}$ of 1.65, an intrinsic viscosity [$\eta$] of 0.05 dl/g, a Z value of 110, and a $\sigma$ value of 0.1. The temperature was raised to 140° C. Then, 105 g of n-butyl methacrylate and 9.0 g of di-tert-butyl peroxide were added, and the mixture was reacted for 4 hours at this temperature. While the reaction mixture was maintained at 140° C., it was subjected to deaeration treatment under vacuum of 10 mmHg for 1 hour to remove volatile components. Cooling gave a liquid modified ethylenic random copolymer which was, a colorless transparent liquid having a number average molecular weight of 1500, a $\overline{Mw}/\overline{Mn}$ of 1.63, an intrinsic viscosity [$\eta$] of 0.06 dl/g and a dynamic viscosity at 100° C. of 200 centistokes. The proportion of n-butyl methacrylate grafted was 16 parts by weight per 100 parts by weight of the ethylene/propylene copolymer in the modified ethylenic random copolymer.

EVALUATION EXAMPLES 1-3

Each of the products obtained in Examples 1 to 3 was used as a modifier in the amounts indicated in Table 1 in blending NBR and EPDM. They were kneaded by an 8-inch open roll mill at a surface temperature of 60°±5° C. for 20 minutes.

The Mooney viscosities of the resulting compositions were measured in accordance with JIS K-6300.

Separately, each of the compositions was heated at 160° C. for 20 minutes to form a rubber sheet having a size of 150×100×2.5 mm. The spring hardness (HS), tensile strength ($T_B$) and elongation ($E_B$) of the sheet were measured in accordance with JIS K-6300. The results are shown in Table 2.

COMPARATIVE EVALUATION EXAMPLE 1

Evaluation Example 1 was repeated except that a naphthenic process oil (Diana Process Oil NM280, a product of Idemitsu Kosan Co., Ltd.) was used instead of the liquid modified ethylene/propylene copolymer as a modifier. The results are shown in Table 2.

A marked decrease in tensile strength was noted.

TABLE 1

| | |
|---|---|
| EPDM (*1) | 35.0 parts by weight |
| NBR (*2) | 65.0 parts by weight |
| Sample | 10.0 parts by weight |
| Zinc flower #3 | 5.0 parts by weight |
| Stearic acid | 1.0 parts by weight |
| HAF carbon black (*3) | 60.0 parts by weight |
| Dioctyl phthalate | 15.0 parts by weight |
| Vulcanization accelerator | |
| CBS (*4) | 1.5 parts by weight |
| MBT (%) | 0.4 parts by weight |
| Diethylene glycol | 2.0 parts by weight |
| Sulfur | 1.5 parts by weight |

(*1) ML$_{1+4}$, (100° C.) 67; ethylene content 67 mole %; iodine value 22; the type of the dienne ENB.
(*2) Nippol 1042 (Nippon Zeon Co., Ltd.)
(*3) Asahi 70 (a product of Asahi Carbon Co., Ltd.)
(*4) Cyclohexyl benzothiazole sulfenamide
(*5) 2-Mercaptobenzothiazole.

TABLE 2

| | Evaluation Example | | | Comparative 1 |
|---|---|---|---|---|
| | 1 | 2 | 3 | |
| Sample | Example 1 | Example 2 | Example 3 | Process oil |
| ML$_{1+4}$, 125° C. of the unvulcanized rubber | 42 | 47 | 46 | 43 |
| Properties of the vulcanized rubber | | | | |
| H$_S$ (JIS-A) | 65 | 66 | 85 | 64 |
| T$_B$ (MPa) | 15.2 | 16.2 | 15.9 | 13.2 |
| E$_B$ (%) | 340 | 360 | 350 | 290 |

EVALUATION EXAMPLE 4

One hundred parts of EPDM (ML$_{1+4}$, 100° C. 65; ethylene content 67 mole%; iodine value 12; the type of the diene ENB), 5 parts by weight of zinc flower #3, 1 part by weight of stearic acid, 60 parts by weight of FEF carbon black (Asahi 60, a product of Asahi Carbon Co., Ltd.), 2 parts by weight of diethylene glycol, 1.5 parts by weight of MBT (vulcanization accelerator), 0.5 part of TMTD (vulcanization accelerator), 1.0 part of sulfur and 50 parts of the product of Example 2 as a modifier were kneaded on an 8-inch open roll mill at a surface temperature of 60°±5° C. for 20 minutes. The properties of the resulting compositions in the uncured and cured states were measured in the same way as in Evaluation Example 1.

To conduct a test for adhesion strength with metal (mild steel; SS41), a piece of mild steel was coated with the resulting composition and an adhesive (a primer coat for mild steel: Chemlok ®205; top coating Chemlok ®233, produced by Hughson Chemicals Co.) and dried. The dried metal piece was pressed at 160° C. for 40 minutes to vulcanize the composition and bond it to the metal piece. Thus, a test piece conforming to JIS K-6301 8.3 was obtained. The test piece was subjected to 90° peeling test in accordance with JIS K-6301 8.3. The results are shown in Table 3.

COMPARATIVE EVALUATION EXAMPLE 2

Evaluation Example 4 was repeated except that the modifier used in Evaluation Example 4 was replaced by a naphthenic process oil (Diana Process Oil NM280). The results are shown in Table 3.

TABLE 3

|  | Evaluation Example 4 | Comparative Evaluation Example 2 |
|---|---|---|
| $ML_{1+4}$, 125° C. of the unvulcanized rubber | 51 | 42 |
| Properties of the vulcanized rubber | | |
| $H_S$ (JIS-A) | 63 | 59 |
| $T_B$ (MPa) | 121 | 131 |
| $E_B$ (%) | 690 | 610 |
| Adhesion strength (kgf/inch) | 44 R (*1) | 16 RC (*2) |

(*1) R: fracture of the rubber portion
(*2) RC: breakage between the rubber portion and the adhesive

EVALUATION EXAMPLE 5

Evaluation Example 1 was repeated except that the liquid modified ethylene/1-hexene copolymer obtained in Example 4 was used as the modifying aid. The results are shown in Table 4.

EVALUATION EXAMPLE 6

Evaluation Example 1 was repeated except that the liquid modified ethylene/propylene copolymer obtained in Example 5 was used as the modifying aid. The results are shown in Table 4.

TABLE 4

|  | Evaluation Example 5 | Evaluation Example 6 |
|---|---|---|
| $ML_{1+4}$, 125° C. of the unvulcanized rubber | 40 | 41 |
| Properties of the vulcanized rubber | | |
| $H_S$ (JIS-A) | 64 | 65 |
| $T_B$ (MPa) | 15.6 | 15.4 |
| $E_B$ (%) | 350 | 340 |

EVALUATION EXAMPLE 7

One hundred parts by weight of polyethylene terephthalate having an intrinsic viscosity of 0.65 dl/g was dry-blended with 5 parts by weight of 5-(N-phthalimide)-sodium caproate as a crystallization accelerator and 5 parts by weight of the product of Example 6, and the mixture was subjected to melt mixing in an extruder (dulmage-type screw with a diameter of 20 mm; L/D 28) (*1). The properties of the resulting polyester composition were examined. It was found to have an E100/E30 ratio (*2), a measure of its heat resistance, of 0.121, a flexural strength of 920 kg/cm², a flexural modulus of 30,000 kg/cm², and a $\Delta H_H/\Delta H_C$, a measure of the ease of crystallization, of 0.190 (*3).

COMPARATIVE EVALUATION EXAMPLE 3

Evaluation Example 7 was repeated except that the product of Example 6 was not used. The resulting polyester composition had an E100/E30 ratio of 0.065, a flexural strength of 890 kg/cm², a flexural modulus of 27,400 kg/cm², and a $\Delta H_H/\Delta H_C$ of 0.327.

(*1): Injection molding

A sample for the flexural test, 0.2 cm in thickness, was prepared at a die temperature of 70° C. using an injection molding machine (Model IS-35P produced by Toshiba Machinery Co., Ltd.)

Flexural test

A rectangular test sample, 1.27 cm wide and 6.35 cm long, cut off from the press sheet, or an injection-molded test sample having the same shape was tested at 23° C. at a crosshead speed of 5 mm/min. using an Instron tensile tester (Model 1122).

(*2): Heat resistance

The temperature dependence of the modulus of elasticity was measured by a dynamic mechanical analyzer (Model 981 made by E. I. du Pont de Nemours & Co.) on a rectangular test sample, 1.27 cm wide and 2 cm long, cut off from the press sheet or the injection-molded sample. The ratio of the modulus of elasticity at 100° C. to the modulus of elasticity at 30° C., E100/E30, was used as an index representing heat resistance.

(*3) $\Delta H_H/\Delta H_C$

Measured by using a differential scanning calorimeter (DSC for short; Model II made by Perkin Elmer Co.). About 5 mg of a sample was weighed from a rapidly cooled press sheet or an injection-molded sheet. The sample was subjected to DSC measurement by heating it at 20° C./min., maintaining it at 290° C. for 5 minutes, and then further heating it at 20° C./min. On the basis of the thermogram obtained, the quantity of heat $\Delta H_H$ was determined from the peak area at the crystallization temperature during temperature elevation. The quantity of heat $H_C$ was determined from the peak area at the time of crystallization during temperature lowering. The $\Delta H_H/\Delta H_C$ ratio is a measure of the ease of crystallization, and the smaller the $\Delta H_H/\Delta H_C$ ratio, the easier the crystallization of the polyester.

EXAMPLE 7

A 2-liter glass flask equipped with a nitrogen blowing tube, a water-cooling condenser, a thermometer, two dropping funnels, and a stirrer was charged with 800 g of a liquid ethylene/propylene random copolymer having an ethylene content of 40 mole%, a number average molecular weight of 1600, a $\overline{M}w/\overline{M}n$ of 2.05, and an intrinsic viscosity [η] of 0.11 dl/g, a dynamic viscosity at 100° C. of 300 centistokes, a Z value of 120 and a σ value of 0.1. The flask was purged with nitrogen for 2 hours to drive off the dissolved oxygen. Thereafter, the inside temperature of the flask was raised to 160° C., and 320 g of trimethoxyvinylsilane and 60 g of di-tert-butyl peroxide previously charged into the two dropping funnels were added dropwise over the course of 4 hours. After the addition, the reaction was carried out further for 4 hours. Then the temperature of the inside of the flask was raised to 180° C., and the unreacted trimethoxyvinylsilane and the decomposition product of di-tert-butyl peroxide were removed under a reduced pressure of 0.5 mmHg.

The resulting modified ethylene/propylene copolymer is a colorless transparent liquid having an intrinsic viscosity of 0.41 dl/g, and a $\overline{Mw}/\overline{Mn}$ of 2.35. The proportion of the trimethoxyvinylsilane component grafted was 25 parts by weight per 100 parts by weight of the ethylene/propylene copolymer in the modified ethylenic random copolymer.

EXAMPLE 8

Example 7 was repeated except that an ethylene/propylene copolymer having a number average molecular weight of 390, an $\overline{Mw}/\overline{Mn}$ of 1.15, an intrinsic viscosity [$\eta$] of 0.03 dl/g, a dynamic viscosity at 100° C. of 4.5 centistokes, a Z value of 20, and a $\sigma$ value of 0.1 was used, and instead of trimethoxyvinylsilane, 465 g of triethoxyvinylsilane and 90 g of di-tert-butyl peroxide were added. The resulting modified ethylene/propylene copolymer was a colorless transparent liquid having an intrinsic viscosity [$\eta$] of 0.28 dl/g and a $\overline{Mw}/\overline{Mn}$ ratio of 2.10. The proportion of the triethoxyvinylsilane component grafted was 34 parts by weight per 100 parts by weight of the ethylene/propylene copolymer in the modified ethylenic random copolymer.

EXAMPLE 9

Example 7 was repeated except that an ethylene/propylene copolymer having an ethylene content of 50 mole%, a number average molecular weight of 810, an $\overline{Mw}/\overline{Mn}$ of 1.40, an intrinsic viscosity [$\eta$] of 0.04 dl/g, a dynamic viscosity at 100° C. of 22.8 centistokes, a Z value of 80, and a $\sigma$ value of 0.1 was used, and the amounts of trimethoxyvinylsilane and di-tert-butyl peroxide were changed to 230 g and 40 g, respectively. The resulting modified ethylene/propylene copolymer was a colorless transparent liquid having an intrinsic viscosity of 0.16 dl/g and a $\overline{Mw}/\overline{Mn}$ ratio of 2.25. The proportion of the trimethoxyvinylsilane component grafted was 25 parts by weight per 100 parts by weight of the ethylene/propylene copolymer in the modified ethylenic random copolymer.

EXAMPLE 10

Example 7 was repeated except that an ethylene/propylene copolymer having an ethylene content of 50 mole%, a number average molecular weight of 810, an $\overline{Mw}/\overline{Mn}$ of 1.40, an intrinsic viscosity [$\eta$] of 0.04 dl/g, a Z value of 80, and a $\sigma$ value of 0.1 was used, and the amounts of trimethoxyvinylsilane and di-tert-butyl peroxide were changed to 1200 g and 240 g, respectively. The resulting modified ethylene/propylene copolymer was a colorless transparent liquid having an intrinsic viscosity of 0.32 dl/g and a $\overline{Mw}/\overline{Mn}$ ratio of 2.40. The proportion of the trimethoxyvinylsilane component grafted was 127 parts by weight per 100 parts by weight of ethylene/propylene copolymer in the modified ethylenic random copolymer.

EXAMPLE 11

Example 7 was repeated except that an ethylene/1-hexene copolymer having an ethylene content of 52 mole%, a number average molecular weight of 790, an $\overline{Mw}/\overline{Mn}$ of 1.43, an intrinsic viscosity [$\eta$] of 0.04 dl/g, a Z value of 85, and a $\sigma$ value of 0.1 was used instead of the ethylene/propylene copolymer, and the amounts of trimethoxyvinylsilane and di-tert-butyl peroxide were changed to 230 g and 40 g, respectively. The resulting modified ethylene/propylene copolymer was a colorless transparent liquid having an intrinsic viscosity of 0.15 dl/g and a $\overline{Mw}/\overline{Mn}$ ratio of 2.45. The proportion of the trimethoxyvinylsilane component grafted was 25 parts by weight per 100 parts by weight of the ethylene/1-hexene copolymer in the modified ethylenic random copolymer.

EVALUATION EXAMPLES 8-9

The product obtained in each of Examples 7 and 8 was blended with a silicone rubber and EPDM in accordance with the compounding recipe shown in Table 5, and the products of Examples 7 and 8 were evaluated as a modifier. The results are shown in Table 6.

COMPARATIVE EVALUATION EXAMPLE 4

Evaluation Example 8 was repeated except that the unmodified ethylene/propylene copolymer used in Example 7 was used instead of the product obtained in Example 7. The results are shown in Table 6.

COMPARATIVE EVALUATION EXAMPLE 5

Evaluation Example 8 was carried out except that the product obtained in Example 7 was not incorporated. The results are shown in Table 6.

Example 8 was repeated except that the unmodified ethylene/propylene copolymer used in Example 7 was used instead of the product obtained in Example 7, and the silicone rubber was not incorporated. The results are shown in Table 6.

TABLE 5

| Compounding recipe | Evaluation Example | | Comparative Evaluation Example | | |
|---|---|---|---|---|---|
| | 8 | 9 | 4 | 5 | 6 |
| EPDM (*1) | 100 | 100 | 100 | 100 | 100 |
| Silicone rubber (*2) | 20 | 20 | 20 | 20 | — |
| Product of Example 7 | 10 | — | — | — | — |
| Product of Example 8 | — | 10 | — | — | — |
| Unmodified ethylene/ propylene copolymer | — | — | 10 | — | 10 |
| Zinc flower (#3) | 5 | 5 | 5 | 5 | 5 |
| Stearic acid | 1 | 1 | 1 | 1 | 1 |
| White carbon (*3) | 50 | 50 | 50 | 50 | 50 |
| Dicumyl peroxide | 5 | 5 | 5 | 5 | 5 |
| Sulfur | 0.2 | 0.2 | 0.2 | 0.2 | 0.2 |
| Nocrac MB (*4) | 2 | 2 | 2 | 2 | 2 |
| Nocrac 200 (*5) | 1 | 1 | 1 | 1 | 1 |

(*1) Mitsui EPT 3045, a product of Mitsui Petrochemical Industries, Ltd.
(*2) Toray Silicone SH410, a product of Toray Inc.
(*3) Nipsil VN3, a product of Nippon Silica Co., Ltd.
(*4) 2-mercaptobenzimidazole, a product of Ouch Shinko Chemical Industry Co., Ltd.
(*5) 2,6-di-tert-butyl 2-methylphenol, a product of Ouch Shinko Chemical Industry Co., Ltd.
Kneading conditions
Kneaded by an 8-inch open roll.
Vulcanization conditions
Press-cured at 160° C. for 20 minutes.

TABLE 6

| Properties | Evaluation Example | | Comparative Evaluation Example | | |
|---|---|---|---|---|---|
| | 8 | 9 | 4 | 5 | 6 |
| Properties of the vulcanizate (in a normal condition) | | | | | |
| $T_B$ (kg/cm$^2$) | 119 | 125 | 110 | 119 | 156 |

TABLE 6-continued

| Properties | Evaluation Example | | Comparative Evaluation Example | | |
|---|---|---|---|---|---|
| | 8 | 9 | 4 | 5 | 6 |
| $E_B$ (%) | 840 | 960 | 1070 | 920 | 1040 |
| $M_{200}$ (kg/cm$^2$) | 22 | 20 | 18 | 21 | 21 |
| $H_S$ (JIS A) | 57 | 54 | 57 | 70 | 70 |
| $P_S$ (%) | 20 | 35 | 60 | 71 | 80 |
| Heat aging resistance (160° C. × 96 hr) | | | | | |
| $T_B$ retention (%) | 110 | 110 | 110 | 110 | 90 |
| $E_B$ retention (%) | 75 | 70 | 60 | 60 | 55 |

EXAMPLE 12

A 2-liter glass flask equipped with a nitrogen blowing tube, a water-cooling condenser, a thermometer, two dropping funnels, and a stirrer was charged with 800 g of a liquid ethylene/propylene copolymer having an ethylene content of 50 mole%, a number average molecular weight of 810, a $\overline{Mw}/\overline{Mn}$ of 1.40, and an intrinsic viscosity of 0.04 dl/g, a Z value of 80 and a $\sigma$ value of 0.1. The flask was purged with nitrogen for 2 hours to drive off the dissolved oxygen. Thereafter, the inside temperature of the flask was raised to 145° C., and 200 g of styrene monomer and 40 g of di-tert.-butyl peroxide previously charged into the two dropping funnels were added dropwise over the course of 8 hours. After the addition, the reaction was carried out further for 4 hours. Then, the temperature of the inside of the flask was raised to 180° C., and the volatile components were removed under a reduced pressure of 0.5 mmHg. Since the resulting products contained by-product polystyrene, it was purified by treatment with activated terra alba.

The purified styrene-modified ethylene/propylene random copolymer was a colorless transparent liquid having an intrinsic viscosity [$\eta$] of 0.06 dl/g, a $\overline{Mw}/\overline{Mn}$ of 1.40, a $\overline{Mw}/\overline{Mn}$ of 1.88 and a glass transition point (Tg) of $-78°$ C. The proportion of the styrene component grafted was 24 parts by weight per 100 parts by weight of the liquid ethylene/propylene copolymer in the modified ethylenic random copolymer when measured by $^{13}$C-NMR analysis.

EXAMPLE 13

Example 12 was repeated except that the amounts of the styrene monomer and di-tert-butyl peroxide used were changed to 500 g and 100 g, respectively, and these compounds were fed over the course of 20 hours. After purification, the resulting styrene-modified ethylene/propylene random copolymer was a colorless transparent liquid having an intrinsic viscosity [$\eta$] of 0.07 dl/g, a $\overline{Mw}/\overline{Mn}$ of 1.91 and a glass transition point (Tg) of $-59°$ C. The proportion of the styrene component grafted was 60 parts by weight per 100 parts by weight of the liquid ethylene/propylene random copolymer in the modified ethylenic random copolymer.

EXAMPLE 14

Example 12 was repeated except that a liquid ethylene/propylene random copolymer having an ethylene content of 68 mole%, a number average molecular weight of 7400, a $\overline{Mw}/\overline{Mn}$ of 2.07, an intrinsic viscosity [$\eta$] of 0.43 dl/g, a Z value of 170, a $\sigma$ value of 0.2 and a crystallinity of 0%. After purification, the resulting styrene-modified ethylene/propylene random copolymer was a colorless transparent liquid having an intrinsic viscosity of 0.73 dl/g and a $\overline{Mw}/\overline{Mn}$ of 2.53. The proportion of styrene grafted was 23 parts by weight per 100 parts by weight of the liquid ethylene/propylene random copolymer in the modified ethylenic random copolymer.

EXAMPLE 15

Example 12 was repeated except that a liquid ethylene/1-hexene random copolymer having an ethylene content of 52 mole%, a number average molecular weight of 790, a $\overline{Mw}/\overline{Mn}$ of 1.43, an intrinsic viscosity of 0.04 dl/g, a Z value of 85, and a $\sigma$ value of 0.1 was used instead of the ethylene/propylene copolymer.

After purification, the resulting styrene/modified ethylene/1-hexene random copolymer was a colorless transparent liquid having an intrinsic viscosity [$\eta$] of 0.05 dl/g and a Mw/Mn of 1.67. The proportion of the styrene component grafted was 23 parts by weight per 100 parts by weight of the ethylene/1-hexene copolymer in the modified ethylenic random copolymer.

EXAMPLE 16

Example 12 was repeated except that alpha-methylstyrene was used instead of the styrene monomer as a grafting component.

After purification, the alpha-methylstyrene-modified ethylene/propylene copolymer was a colorless transparent liquid having an intrinsic viscosity [$\eta$] of 0.06 dl/g and a $\overline{Mw}/\overline{Mn}$ of 1.79. The proportion of the alpha-methylstyrene grafted was 24 parts by weight per 100 parts by weight of the ethylene/propylene copolymer in the modified ethylenic random copolymer.

EVALUATION EXAMPLES 10–14

Each of the products obtained in Examples 12 to 16 was evaluated as a modifier for a tackifier based on a styrene/isoprene/styrene block copolymer (TR-1107 manufactured by Shell Chemical Co.; to be abbreviated as SIS), and the results are summarized in Table 5. The method of evaluation was as follows:

Eighty grams of SIS, 100 g of a tackiness imparting agent (Hirez ®T-300X, a product of Mitsui Petrochemical Industries, Ltd.), 30 g of a mineral oil (Shell 22R, a product of Shell Oil Co.), 3 g of an antioxidant (Irganox ®1010, a product of Ciba-Geigy Co., Ltd.) and 20 g of each of the products of Examples 12 to 16 were kneaded at 150° C. for 35 minutes by a kneader to prepare a tackifier. The tackifier in the hot molten state was coated to a thickness of 30 microns ±5 microns on a polyester film having a thickness of 25 microns placed on a hot plate kept at 195° C. to prepare a pressure-sensitive tape. The tack and adhesion strength of the tape was examined in accordance with the methods of JIS Z-1524.

COMPARATIVE EVALUATION EXAMPLE 7

Evaluation Example 10 was repeated except that the product of Example 12 was not added. The results are shown in Table 7.

COMPARATIVE EVALUATION EXAMPLE 8

Evaluation Example 10 was repeated except that the starting liquid ethylene/propylene random copolymer used in Example 12 was used instead of the product of Example 12. The results are shown in Table 7.

COMPARATIVE EVALUATION EXAMPLE 9

A high-density polyethylene wax (Mitsui HiWax 200P, a product of Mitsui Petrochemical Industries, Ltd.) having an intrinsic viscosity [η] of 0.35 dl./g and a crystallinity of 88 % was modified by grafting styrene thereto to obtain a styrene-modified high-density polyethylene wax in which 10 parts by weight of styrene was grafted per 100 parts by weight of the high-density polyethylene wax.

Evaluation Example 10 was repeated except that the resulting styrene-modified high-density polyethylene wax was used instead of the product of Example 12. The results are shown in Table 7.

COMPARATIVE EVALUATION EXAMPLE 10

Evaluation Example 10 was repeated except that the tackifier was prepared by adding 20 g of a mineral oil instead of the product of Example 12. The results are shown in Table 7.

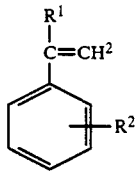

wherein $R^1$ and $R^2$, independently represent a hydrogen atom or an alkyl group having 1 to 4 carbon atoms, or (c) 0.2 to 300 parts by weight of an unsaturated silane compound represented by the formula

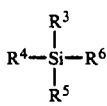

wherein one or two of $R^3$, $R^4$, $R^5$ and $R^6$ represent a

TABLE 7

| Evaluation | Type of the modifier | Tack (ball No.) at 20° C. (*) | Adhesion strength at 20° C. (g/25 cm width) |
|---|---|---|---|
| Evaluation Example 10 | Product of Example 12 | 9 | 1860 |
| Evaluation Example 11 | Product of Example 13 | 7 | 1960 |
| Evaluation Example 12 | Product of Example 14 | 8 | 1920 |
| Evaluation Example 13 | Product of Example 15 | 9 | 1810 |
| Evaluation Example 14 | Product of Example 16 | 9 | 1840 |
| Comparative Evaluation Example 7 | None (blank) | 4 | 1670 |
| Comparative Evaluation Example 8 | Unmodified ethylene/propylene random copolymer | less than 2 | 980 |
| Comparative Evaluation Example 9 | Styrene-modified high-density polyethylene was | less than 2 | 530 |
| Comparative Evaluation Example 10 | Mineral oil | 12 | 1000 |

(*) Measured in accordance with the method of JIS Z-1524

What is claimed is:

1. A process for improving the dynamical properties of rubbery polymer compositions or resins comprising admixing 0.2 to 200 parts by weight of a modified ethylenic random copolymer with 100 parts by weight of a rubbery polymer composition or a resin, said rubbery polymer composition comprising (a) an ethylene/alpha-olefin or ethylene/alpha-olefin/diene elastomeric copolymer or a mixture of the elastomeric copolymer (a) with (b) at least one rubbery polymer selected from the group consisting of natural rubbers, chloroprene rubber, isoprene rubber, butadiene rubber and acrylic rubber, wherein said modified ethylenic random copolymer consists of 100 parts by weight of a base ethylenic random copolymer composed of 25 to 75 mole % of ethylene and 75 to 25 mole % of an alpha-olefin having 3 to 20 carbon atoms having grafted thereto (a) 0.2 to 50 parts by weight of an unsaturated carboxylic acid having 3 to 10 carbon atoms or an anhydride or ester thereof, (b) 0.2 to 200 parts by weight of a styrene hydrocarbon having 8 to 12 carbon atoms and represented by the formula vinyl or allyl group, and the remainder represent a hydrogen atom, a lower alkyl group, a lower alkoxy group, a lower alkanoyl group, a lower alkoxyalkoxy group, an aryl group, an aryloxy group, an aralkyl group, or an aralkoxy group, provided that the total number of carbon atoms of $R^3$, $R^4$, $R^5$ and $R^6$ is in the range of 2 to 20;

said modified ethylenic random copolymer having an intrinsic viscosity (η), measured in decalin at 135° C., of 0.01 to 1.5 dl/g and a molecular weight distribution ($\overline{Mw}/\overline{Mn}$), measured by gel permeation chromatography, of not more than 4; and said base ethylenic random copolymer being liquid and having (i) a number of average molecular weight ($\overline{Mn}$) of 200 to 10,000, (ii) a number average molecular weight distribution ($\overline{Mw}/\overline{Mn}$), measured by gel permeation chromatography, of not more than 4, (iii) a Z value of 10 to 300, and (iv) a ρ value of 0 to 2.

2. The process according to claim 1, wherein said base ethylenic random copolymer has grafted thereto said unsaturated carboxylic acid, anhydride or ester thereof, or said unsaturated silane compound; and said modified ethylenic random copolymer is admixed with a rubbery polymer composition.

3. The process according to claim 2, wherein said ethylene/alpha-olefin elastomeric copolymer has an ethylene content of 30 to 90 mole % and a crystallinity of 0 to 30%.

4. The process according to claim 2, wherein said ethylene/alpha-olefin elastomeric copolymer has an ethylene/alpha-ofefin mole ratio of 0.3 to 9 and a diene content of 0.5 to 10 mole %.

5. The process according to claim 2, wherein said rubbery polymer composition comprises 5 to 95 parts by weight of (A) and 95 to 5 parts by weight of (B).

6. The process according to claim 2, wherein said base ethylenic random copolymer has grafted thereto said unsaturated carboxylic acid, anhydride or ester thereof; and 1 to 50 parts by weight of said modified ethylenic random copolymer is admixed with 100 parts by weight of a rubbery polymer composition comprising 5 to 95 parts by weight of (A) an ethylene/alpha-olefin elastomeric copolymer having an ethylene content of 30 to 90 mole % and a crystallinity of 0 to 30%, or an ethylene/alpha-olefin/diene elastomeric copolymer having an ethylene/alpha-olefin mole ratio of 0.3 to 9 and a diene content of 0.5 to 10 mole %, and 95 to 5 parts by weight of (B) a rubber selected from the group consisting of natural rubbers, chloroprene rubber, isoprene rubber, butadiene rubber and acrylic rubber.

7. The process according to claim 2, wherein said base ethylenic random copolymer has grafted thereto said unsaturated silane compound; and 0.2 to 200 parts by weight of said modified ethylenic random copolymer is admixed with 100 parts by weight of a rubber polymer composition comprising 5 to 95 parts by weight of (A) an ethylene/alpha-olefin elastomeric copolymer having an ethylene content of 30 to 90 mole % and a crystallinity of 0 to 30%, or an ethylene/alpha-olefin/diene elastomeric copolymer having an ethylene/alpha-olefin mole ratio of 0.3 to 9 and a diene content of 0.5 to 10 mole %, and 95 to 5 parts by weight of (B) a silicon-containing rubber.

8. The process according to claim 1, wherein the base ethylenic random copolymer is composed of 30 to 70 mole % of the ethylene units and 70 to 30 mole % of the alpha-olefin having 3 to 20 carbon atoms.

9. The process according to claim 1, wherein the base ethylenic random copolymer has a molecular weight distribution ($\overline{M}w/\overline{M}n$) of from 1.2 to 2.5.

10. The process according to claim 1, wherein the base ethylenic random copolymer has a number average molecular weight of 400 to 8,000.

11. The process according to claim 1, wherein the base ethylenic random copolymer has a Z value of 15 to 250.

12. The process according to claim 1, wherein the alpha-olefin has 3 to 10 carbon atoms.

13. The process according to claim 12, wherein the alpha-olefin is propylene.

14. The process according to claim 1, wherein the unsaturated carboxylic acid or its anhydride or ester is selected from the group consisting of acrylic acid, methacrylic acid, maleic acid, maleic anhydride and glycidyl methacrylate.

15. The process according to claim 1, wherein the unsaturated carboxylic acid or its anhydride or ester is grafted in a proportion of 0.5 to 40 parts by weight.

16. The process according to claim 1, wherein the styrene hydrocarbon is styrene.

17. The process according to claim 1, wherein the styrene hydrocarbon is grafted in a proportion of 0.5 to 150 parts by weight.

18. The process according to claim 1, wherein the unsaturated silane compound is trimethoxyvinylsilane or triethoxyvinylsilane.

19. The process according to claim 1, wherein the unsaturated silane compound is grafted in a proportion of 0.5 to 200 parts by weight.

* * * * *